July 7, 1936. J. S. McCHESNEY 2,046,337
CORRUGATED JOINT FASTENER
Filed June 6, 1932 2 Sheets-Sheet 1
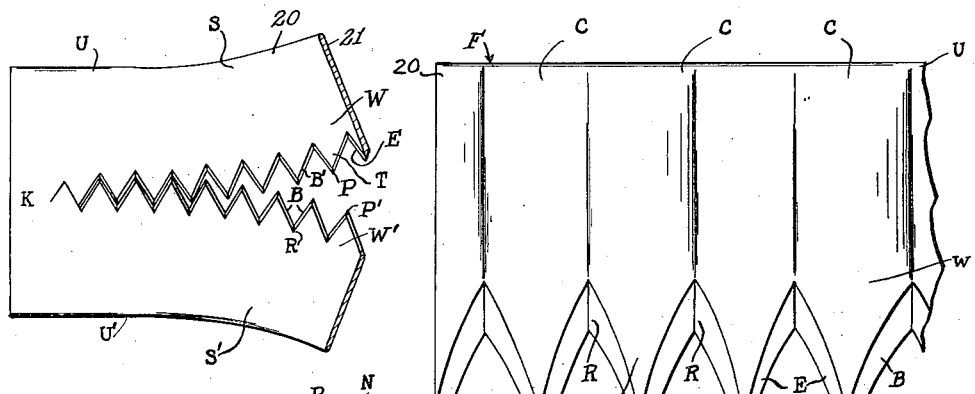
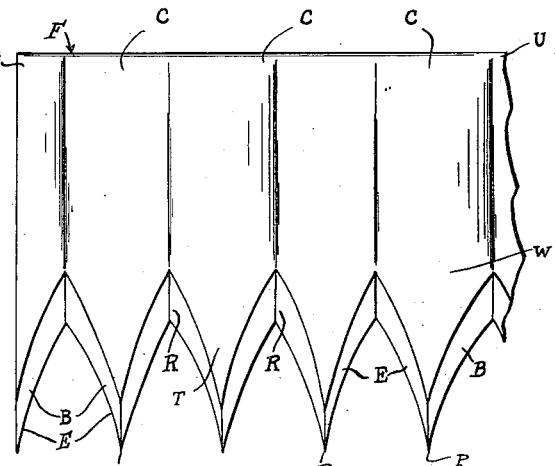
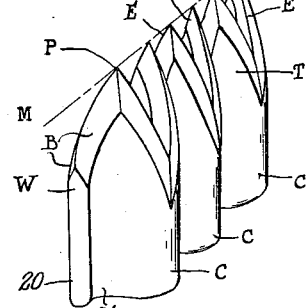
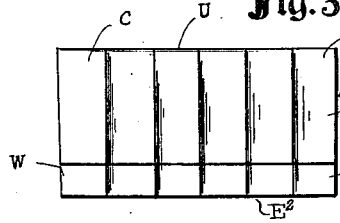
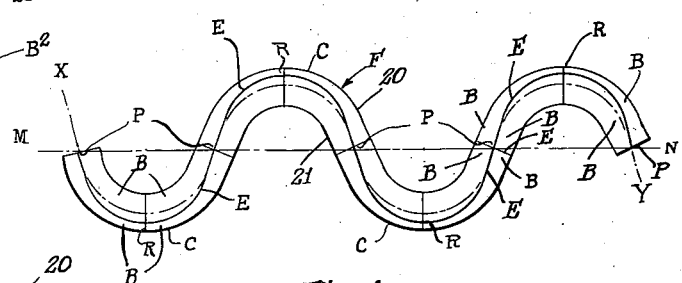
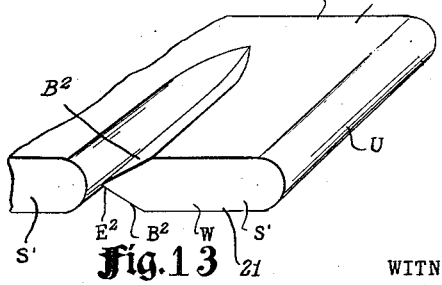

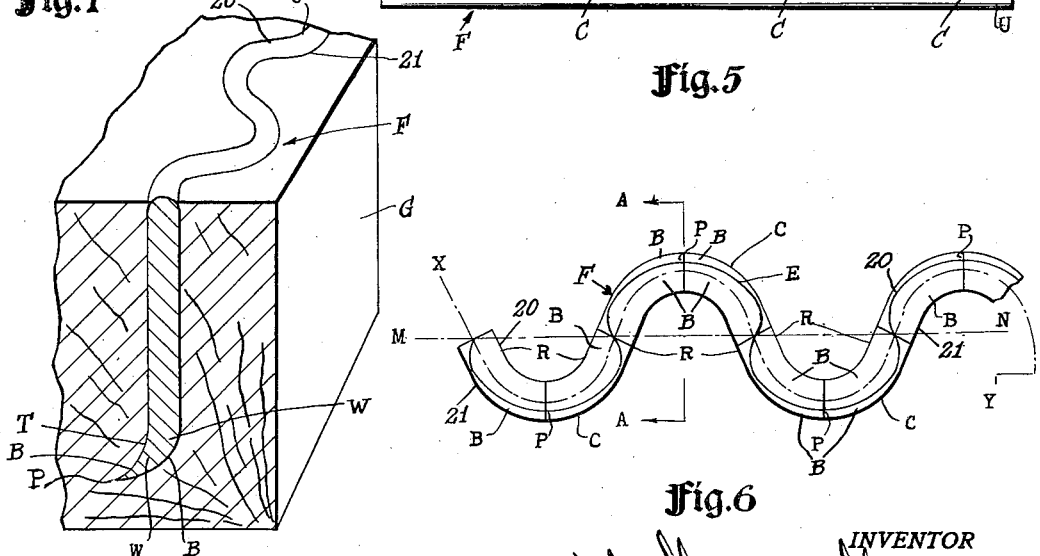

Patented July 7, 1936

2,046,337

UNITED STATES PATENT OFFICE 2,046,337

CORRUGATED JOINT FASTENER

John Sherman McChesney, Chicago, Ill.; Lula A. McChesney, executrix of said John Sherman McChesney, deceased, assignor to Lula A. McChesney, Chicago, Ill.

Application June 6, 1932, Serial No. 615,512

22 Claims. (Cl. 85—11)

This invention relates to improvements in corrugated fasteners for use in woodworking and the like.

The salient feature is to provide a swage-beveled, swage-hardened and swage-sharpened corrugated fastener that is capable of being manufactured from metallic ribbon in a simple, rapid and economical manner. Another object is to increase the number of finished corrugated fasteners obtainable from a given area of fastener stock. A further object is the positioning of the apexes of the teeth with respect to the line of the medial plane of the fastener. A still further object is to provide a fastener made from a fastener blank having a smooth sharp-cutting knife-like penetrating end, the fastener being completed when it is mechanically corrugated and requiring no other treatment to adapt it for use except to cut the corrugated strip into suitable lengths. A still further object is to provide a corrugated fastener having a toothed penetrating end, the teeth thereof adapted to self-clinch into the material into which it is driven transverse the line of penetration, thereby to securely hold the fastener against retrograde movement. A still further object is to control the transverse clinching movement of the teeth of the penetrating end of the fastener. A general object is the provision of an unlimited combination of tooth arrangements and configurations. Other objects of the invention relate to various features of construction and arrangement which will appear more fully hereinafter.

The nature of the invention will be understood from the following specification taken with the accompanying drawings.

In the drawings, which illustrate the article on an enlarged scale for clearness:

Figure 1 is a plan view of a section of metal ribbon partly swage-beveled and swage-severed into two sharp-pointed toothed strips from which the improved fasteners are formed.

Fig. 2 is an enlarged plan view of a portion of a toothed corrugated strip.

Fig. 3 is a perspective view of a finished fastener severed from the strip shown in Fig. 2.

Fig. 4 is an enlarged broken bottom plan view of the strip illustrated in Fig. 2 or a top plan view of a portion of the corrugated fastener shown in Fig. 3.

Fig. 5 is an enlarged side view of a finished sectional length of corrugated strip with toothed points positioned in the outer crests of the corrugations.

Fig. 6 is an enlarged top plan view of the fastener shown in Fig. 5.

Fig. 7 is a reduced perspective view of the fastener shown in Fig. 5.

Fig. 8 is a perspective view, partly in section, of a driven fastener taken on a line corresponding to line A—A of Fig. 6 illustrating the self-clinching beveled penetrating end of the fastener embedded in material.

Fig. 9 is a side view of one embodiment of means for corrugating the swaged strip or blank.

Fig. 10 is a transverse sectional view of metal ribbon initially positioned between swaging elements preparatory to swage-beveling and swage-severing the ribbon into strips.

Fig. 11 is a transverse sectional view of elongated, swaged, severed fastener stock and swage-severing dies.

Fig. 12 is a sectional view of rotary swaging rolls simultaneously forming a half-round driving end and a beveled penetrating end on a continuous length of fastener ribbon.

Fig. 13 is a perspective view of partly severed fastener strip having a straight penetrating end.

Fig. 14 is a side view of a finished corrugated fastener of beveled, plain penetrating end and rounded driving end.

Heretofore the penetrating ends of fasteners have been produced by first transversely corrugating flat metallic ribbon, thereafter grinding, milling, or shearing the two surfaces of the corrugated metal adjacent to one edge portion thereof, thereby producing on the convex bends reversed bevels forming a series of teeth having their points or apexes lying substantially in the plane of the medial line of the corrugations. Still another method employs a flat metallic strip which is preferably beveled on both sides of its median line by being milled, or scraped, or sheared with stationary or oscillating knives or by grinding means. This sharp-edged strip is thereafter corrugated and the metal of the side edge of the corrugations is removed to produce a series of teeth having semi-circular reversed beveled surfaces extending from the outer crests of the corrugations slantwise and intersecting on the line of the mid-plane of the corrugations, forming tooth apexes. All such previous fasteners have required the removal of a substantial amount of metal in order to produce a penetrating end, the beveled surfaces thus produced being rough and bearing the tool marks of the sharpening means and in addition a fin or burr along the cut edges.

In the fastener of my invention, I first simultaneously swage-bevel, swage-harden and swage-sever a metallic ribbon K shown in Fig. 1, into two toothed strips S and S¹, each strip having a finished penetrating end requiring no further sharpening treatment. The penetrating end W is produced by swaging elements D as shown in Figs. 10, 11 and 12. These swaging elements co-act and complete simultaneously, without removal of metal, sharpened fastener strips and the penetrating end is thus produced by the co-acting opposed swaging dies which have a given shape, the counterpart of which is imparted to the ribbon against which the dies are forcibly impressed producing smooth burnished inclined swage-hardened relatively narrow surfaces B. The swaged metal of the penetrating end of the fastener strip is of greater density and hardness than the unswaged and uncompressed portions of the strip.

In the preferred embodiment of my fastener generally designated F, in Figs. 2 to 8 inclusive and in Fig. 14, I provide a driving end U, a penetrating end W having a series of curved beveled teeth T defined by relatively wide curved beveled surfaces 20 and 21 and having smooth burnished inclined relatively narrow surfaces B oppositely disposed on each side of a cutting edge E which is curved and undulated and extends the entire length of the penetrating end. The entrant edge of the penetrating end is provided with a tooth point or apex P and the reentrant edge is formed by the root R of the tooth.

The next step in the manufacture of the fastener strip is to impart corrugations C. Any suitable machinery such as shown in Fig. 9 may be employed. At this stage of manufacture, two courses are open, one in which care and accuracy are required in the treatment of the pre-sharpened strip S in order to bring the tooth points or apexes P in position with respect to the line M—N of the medial plane of the fastener, producing a tooth arrangement substantially as shown in Figs. 3 and 7; or the pre-sharpened stock S may be passed through the corrugating means without attention to the positioning of the apexes with respect to the line M—N of the medial plane of the fastener, thereby resulting in random, misaligned or unsymmetrical positioning of the apexes. Due to the novel curved teeth T having curved beveled side edges B at the penetrating end or edge W, the fastener of my invention will drive successfully with the tooth points P located in pre-determined position with respect to the mid-plane M—N of the fastener as shown in Figs. 3, 4, 6 and 7, or when the apexes P are positioned unsymmetrically.

Corrugated fasteners produced in accordance with the swaging process disclosed herein are provided with a swage-hardened, swage-sharpened, swage-beveled penetrating end W, said penetrating end being of greater hardness and stiffness than the surrounding metal of the fastener and the inclined burnished burr-free surfaces B thereof. The hardened metal of the penetrating end maintains the keenness of the beveled cutting edge E when penetrating hard or soft wood or like material to a greater degree than fasteners of the prior art which have a penetrating end produced by a grinding, shearing or milling process; the prior art processes do not impart hardness, nor a smooth burnished surface, but on the contrary tend to burn and to soften the metal at the penetrating end.

The teeth T may be of any desirable width and depth, thereby producing a wide variety of tooth configurations. The self-clinching of the teeth is accomplished by imparting to the tooth T such inclination of the inner beveled surfaces B as will cause the teeth to travel across the plane of penetration of the corrugations C during the driving operation. The direction and extent of the travel is dependent on the length of the teeth in combination with the wedge-like inclined surface area acting to forcibly impart transverse movement to the teeth apexes P during driving, as is illustrated in Fig. 8 wherein the fastener has penetrated the material G and the apex P has moved transverse the line of penetration of the corrugations.

Commercial fasteners, as well as those of the prior art, are provided with teeth formed after corrugating and have teeth points or apexes positioned in the medial plane of the fastener. Such fasteners are not adapted to maintain an unsupported upright driving position and therefore must be manually held; whereas, in the fastener of my invention the apexes may be arranged on opposite sides of the line M—N as in Fig. 7, or be unsymmetrically arranged to support the fastener in an upright position preparatory to driving.

Corrugated fasteners of my invention, indeterminate as to length and of either the toothed type or the plain-edged type are adapted for use in machines for making and driving corrugated fasteners.

In Figs. 4 and 6 the medial line X—Y is of wave-like formation and follows the contour of the bent and rebent metal of the fastener F substantially mid-way the relatively wide longitudinal faces 20 and 21 of the corrugations C of the metal strip.

The knife-like cutting edge E is positioned between the medial line X—Y and the longitudinal faces 20 and 21 of the strip S along the outer crests of the corrugations C and is substantially mid-way the longitudinal sides 20 and 21 of the strip on the line of the medial plane M—N of the fastener.

The reference characters, U, P, R, T, B, and W of strip S, correspond to the elements U¹, P¹, R¹, T¹, B¹, and W¹, respectively, of strip S¹, where they appear in the figures of the drawings.

It will be observed that the penetrating edges of my improved fastener may comprise teeth disposed in the medial plane of the fastener, as illustrated for example in Fig. 3; or teeth arranged in rows on opposite sides of the medial plane of the fastener, as shown in Fig. 7. In Fig. 14 a corrugated fastener F¹ having an untoothed penetrating edge E² is shown. The fasteners of this type are formed preferably by swage-beveling and swage-hardening the surfaces B², B³ by the method above described. A partially severed ribbon K is shown in Fig. 13 which illustrates the formation of the fasteners F¹.

The word "toothed" as used in the specification is to be taken in its broad sense for I contemplate the use of a wide variety of penetrating edges, such as plain untoothed edges illustrated in Fig. 14, or teeth of castellated, serrated or of pyramidal form.

Manifestly, the construction shown is capable of considerable modification and such modification as is within the scope of my claims I consider within the spirit of my invention.

I claim:—

1. A fastening device comprising a metallic strip provided with a swaged continuous sharp-cutting toothed edge V shaped when viewed in cross section, the metal forming the inclined surfaces thereof of greater density and of greater hardness than the surrounding metal of the fastener, said metallic strip being corrugated transversely of the toothed edge to produce a wavy cutting edge.

2. A fastening device comprising a metallic strip provided with a continuous sharp-cutting toothed beveled knife-like penetrating edge formed by a compression of the metal thereof, said penetrating edge having smooth, inclined, burnished surfaces of greater hardness than the uncompressed metal of the fastener, the strip being so corrugated that the teeth are in a well defined arc at the penetrating edge.

3. A metal fastener adapted to be driven into wood or like material either with or across the grain, said fastener comprising a body portion having swage-hardened swage-bevelled saw teeth at the penetrating end, said body portion corrugated transversely of the penetrating end, said saw teeth having opposed inclined unequally bevelled entrant and reentrant surfaces shaped to impart clinching action to said teeth during the driving of the fastener.

4. A fastening device comprising a strip of metal provided with a swage-finished sharp toothed entering end, the strip being corrugated positioning the apexes of the teeth in alignment with the plane of the medial line of the corrugations, said corrugations also forming said sharp toothed entering end into curved undulating swaged cutting edges along the entire toothed edge.

5. A fastening device comprising a toothed edged strip simultaneously swage-bevelled and severed from a metallic ribbon, said strip provided with a succession of swage-bevelled swage-hardened undulated burr-free teeth at the penetrating end, said strip being corrugated transversely of the toothed edge to produce a continuous swage-hardened undulated cutting edge.

6. A fastener device comprising a length of metal stock provided with a swaged serrated bevelled cutting edge, said metal being corrugated transversely of the serrated cutting edge forming a series of curved teeth having curved bevelled side edges.

7. A metallic fastener comprising a relatively thin metallic ribbon provided at the penetrating end with a swage-bevelled hardened smooth finished toothed edge, said metallic strip being corrugated transverse said penetrating end thereby forming an undulated continuous swage-hardened cutting edge extending entirely across the penetrating end of the fastener.

8. A fastener of the character described, comprising in combination a length of metal having one edge swaged into a series of sharp-cutting oppositely bevelled serrations, having curved side edges, the metal being corrugated transversely thereof and forming a series of curved oppositely bevelled serrated edges defining a series of sharp swaged oppositely bevelled curved cutting edges.

9. A fastener comprising a relatively thin metal strip provided with a swaged sharp bevelled toothed edge, corrugations extending transversely of the toothed edge, said corrugations oppositely staggering the apexes of said toothed edge relative to each other across the medial line of the fastener.

10. A fastening device comprising a flat and relatively thin metal strip having a series of teeth each swage-bevelled on four sides forming four swage-hardened cutting edges comprising two longitudinal and two transverse cutting edges, the metal being corrugated transversely of said teeth forming an undulating curve of the longitudinal cutting penetrating edges.

11. A fastener comprising a relatively thin rectangular metallic blank having a succession of swage-bevelled swage-hardened teeth on one edge thereof, each said teeth having four bevelled sides, the intersection of said bevelled sides forming a sharp cutting longitudinal edge positioned midway the longitudinal side edges of the strip, said metallic blank being corrugated thereby forming swage-hardened concave and convex surfaces on the teeth, forming each said teeth with unequally oppositely disposed bevelled surfaces adjacent the crests of the corrugations, said bevelled surfaces adapted to guide the teeth with a clinching action.

12. A fastener comprising a strip of metal swaged from a strip of stock and having a series of teeth each oppositely swaged bevelled to provide apex portions, longitudinal cutting edges and oppositely swaged bevelled re-entrant portions, said strip being corrugated curving the swaged bevelled portions and forming curved connecting longitudinal cutting edges, said cutting edges being substantially within the contour of said corrugations.

13. A fastening device comprising a strip of metal having a swaged saw tooth penetrating end comprising a series of swaged pyramidal apexes and re-entrant roots including swage-formed cutting edges, the swage-formed cutting edges of said apexes and re-entrant roots being of greater density and of greater hardness than the unswaged adjacent metal of the fastener.

14. A fastener comprising a length of relatively thin metal having a series of swage-hardened pyramidal saw teeth on one edge thereof, each said teeth being formed of four opposed bevelled side edges oppositely inclined and oppositely bevelled.

15. A fastener comprising a length of relatively thin metal having a series of swage-hardened pyramidal saw teeth on one edge thereof, each said teeth being formed of four opposed bevelled side edges oppositely inclined and oppositely bevelled said fastener having corrugations extending transversely of the saw teeth forming a series of curves of the four opposed bevelled side edges.

16. A fastening device comprising a strip of metal provided with a series of swage-bevelled swage-sharpened teeth having pyramidal apexes, said strip being corrugated to position the apexes of the teeth in spaced relation substantially equidistant each from the next succeeding apex along the concave-convex contour portions of the corrugations.

17. A fastening device comprising a metallic strip provided with a series of teeth on one edge thereof, each said teeth having four oppositely inclined bevelled surfaces converging to form a tooth apex and diverging to form angular toothed roots, said strip being corrugated transversely of the toothed formation.

18. A fastening device comprising a metallic strip provided with swage-bevelled saw teeth of pyramidal appearance on one edge of said strip each tooth including oppositely inclined bevelled side surfaces, said saw teeth having a continuous longitudinal cutting edge midway the side edges of the strip, said strip being corrugated transversely of the longitudinal cutting edge forming said side surfaces into curved bevelled surfaces extending from the apex to the root of each tooth and curving said cutting edge forming an undulated cutting edge.

19. A fastening device comprising a corrugated metallic strip having on the penetrating end a series of teeth each provided with two relatively short transverse and two relatively long longitudinal swage-bevelled swage-sharpened cutting edges each of said toothed formations having apexes the surfaces of which are of pyramidal appearance, and swage-hardened re-entrant root surfaces, said strip being corrugated transversely of the saw toothed formations forming curved bevelled surfaces extending outwardly from the apex to the root of each tooth, said two relatively long cutting edges lying within the longitudinal side edges of the corrugations and following the contour of the corrugations, thereby forming a wave-like longitudinal cutting edge; said two relatively short cutting edges extending oppositely from the apex of each tooth and terminating at the opposite longitudinal side edges of the strip.

20. A fastener device comprising a length of metal stock provided with a swaged serrated bevelled cutting edge, said metal being corrugated transversely of the serrated cutting edge forming a series of oppositely bevelled curved serrations and a wave-like longitudinal cutting edge, said cutting edge being positioned substantially between the longitudinal side edges of the corrugations of the metal and short of the side face at the outer convex crest of the corrugations; the apexes of the serrations being positioned in unsymmetrical relation.

21. A fastener device comprising a length of metal stock provided with a swaged serrated bevelled cutting edge, said metal being corrugated transversely of the serrated cutting edge forming a series of curved teeth having curved bevelled side edges, each tooth with respect to the next succeeding tooth having its apex positioned on the opposite side of the longitudinal mid plane of the fastener.

22. A fastener device comprising a length of metal stock provided with a swaged serrated bevelled cuting edge, said metal being corrugated transversely of the serrated cutting edge forming a series of curved teeth having curved bevelled side edges, each tooth with respect to the next succeeding tooth having its apex on the opposite side of the longitudinal mid plane of the fastener presenting a series of apexes on each side lying substantially in respective planes parallel to the longitudinal mid plane of the fastener.

JOHN SHERMAN McCHESNEY.